March 4, 1924.
C. S. RHOADS
TENSION TESTER OR INDICATOR
Filed April 29, 1920
1,485,713
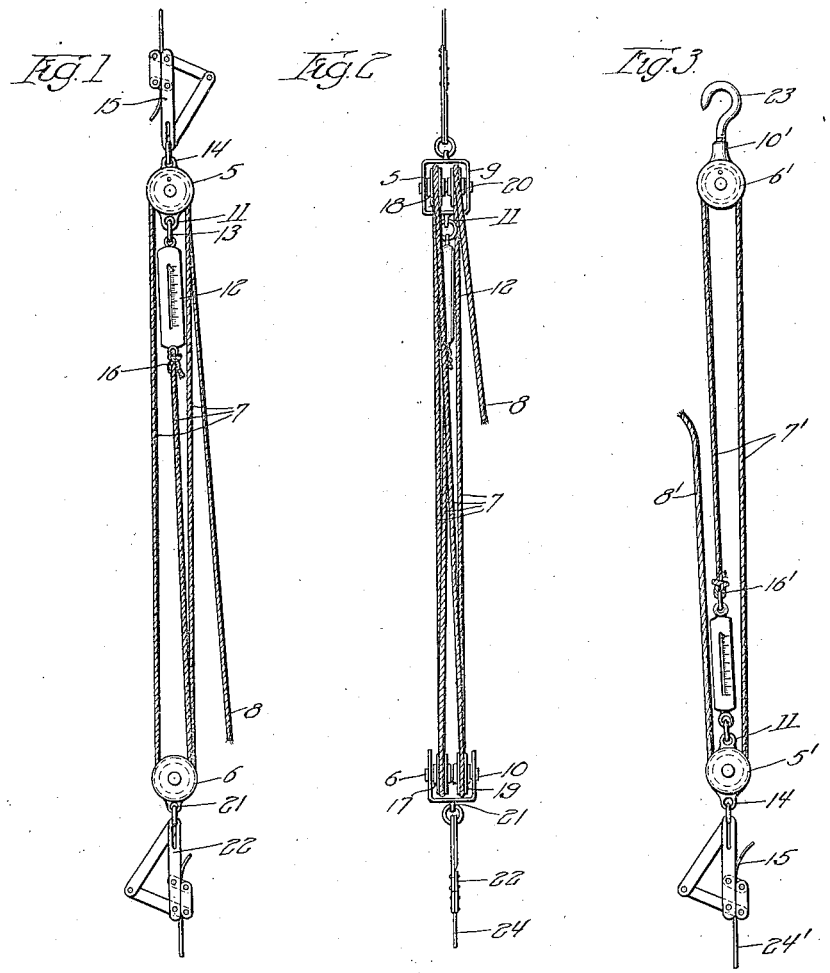
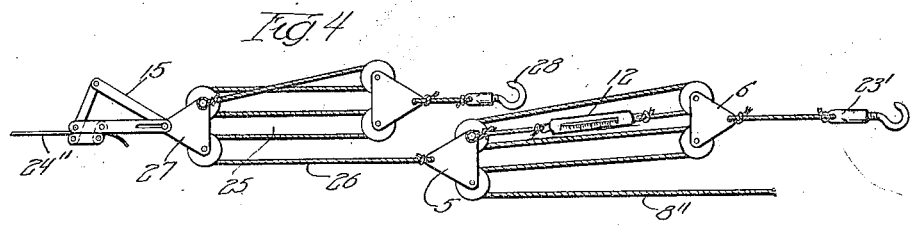
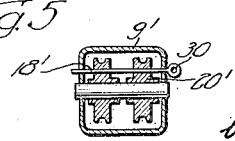
Inventor
Charles S. Rhoads
by Gabel & Mueller
Attys.

Patented Mar. 4, 1924.

1,485,713

UNITED STATES PATENT OFFICE.

CHARLES STANLEY RHOADS, OF YONKERS, NEW YORK.

TENSION TESTER OR INDICATOR.

Application filed April 29, 1920. Serial No. 377,631.

*To all whom it may concern:*

Be it known that I, CHARLES STANLEY RHOADS, a citizen of the United States, residing at Yonkers, in the county of Westchester and State of New York, have invented a certain new and useful Improvement in Tension Testers or Indicators, of which the following is a full, clear, concise, and exact description, reference being had to the accompanying drawings, forming a part of this specification.

My invention relates to tension testers or indicators, in combination with wire stringing block and tackle and has for its object the provision of a means for readily indicating the tension placed upon a wire or other flexible member while the same is being erected.

It is a purpose of the invention to provide means for readily indicating the tension being placed on a wire or other flexible member while the same is being erected. It has been customary in erecting or stringing wires to tension the same entirely by guess work. It has been the general practice up to the present time to tension the wires while being erected merely by guess work and as a result the desired tension on the wire for the best results has seldom been obtained. By the present invention the proper tension for different conditions and lengths of spans can be obtained accurately due to the use of the tension indicator in connection with the wire stretching device.

More specifically it is the object of my invention to provide a tension indicator that will receive only a fraction of the pull exerted on the wire, cable or other member whose tension it is desired to measure.

It is a further object of my invention to provide a tension indicating means of the above character so located between a plurality of pulleys having means for connecting them that the indicating means will receive only a portion of the stress that is to be measured. The indicator can bear any desired scale, such as the tension to be measured in pounds on the flexible member, or on the tension indicating means itself, or a scale can be provided showing directly the amount each kind and gauge of wire or other flexible member shall be pulled up for different span lengths and temperatures.

Reference will now be had to the accompanying drawings wherein Fig. 1 is a side elevation of one form of my improved tension indicating means, with one form of grips associated therewith.

Fig. 2 is an edge elevation of the same.

Fig. 3 is a side elevation of a slightly modified arrangement of the tension indicating means, one of the grips being omitted and a hook substituted therefor.

Fig. 4 is a diagrammatic view showing a further modified arrangement of the tension indicating means.

Fig. 5 is a detail sectional view of a pulley block, showing a locking means therefor.

My improved tension indicating device comprises spaced pulley members 5 and 6 connected by a plurality of lengths 7 of a flexible member such as a rope or cable 8. The pulley members 5 and 6 may each comprise a single pulley or any number of pulleys, depending on the number of lengths of the flexible member it is desired to extend between the pulley members. In the arrangement shown in Figs. 1 and 2, two pulleys are provided on each of the members 5 and 6. The block 9 of the pulley member is provided with an eye 11, or other suitable means for securing the spring balance or other tension indicating means 12 thereto in any suitable manner such as by a ring 13 engaging with eye 11 and an eye in member 12. The member 9 is provided with an additional eye 14 for securing any suitable wire gripping means 15 to said pulley member 5. This wire gripping means may be of any form, that shown being a common commercial form of wire grip.

The one end 16 of the flexible member 8 is secured to the end of the spring balance opposite that secured to the pulley member 5 and in the form shown in Figs. 1 and 2 first passes over the pulleys 17 on member 6 and then over the pulley 18 on member 5, then back again to member 6 and over the pulley 19 and finally over the pulley 20. The free end of the member 8, shown broken away in the drawings, is adapted to be pulled in any suitable manner to operate the device.

The block 10, in the form shown in Figs. 1 and 2, is provided with an eye 21 for securing any suitable gripping means 22 thereto, while in the form shown in Fig. 3 the block 10 has a hook 23, or any other suitable grappling member associated therewith.

In the form of the invention shown in Fig. 3 the pulley member 5' is constructed in a manner similar to the member 5 in Figs. 1 and 2, except that it is provided with only a single pulley. The pulley member 6' is also provided with but a single pulley. The tension indicating means 12 and the other parts associated with the member 5' are precisely the same as those used in the form shown in Figs. 1 and 2. The flexible member 8' in the form shown in Fig. 3 has its lengths 7' extending from the end 16' attached to the spring balance 12', first over the pulley of member 6' and then over the pulley of member 5', the free end of the member being adapted to be pulled in any suitable manner.

It will be evident from the above description that there are four lengths 7 of the flexible member 8 between the pulleys in Figs. 1 and 2 and two lengths 7' of the flexible member 8' between the pulleys in Fig. 3. Now if the gripping members 15 in Figs. 1 and 2 are secured to the ends of a wire or other flexible member or to any two points thereon and a pull is exerted on the end of member 8, the pull on the wire 24 for example, will be five times as great as that exerted on the member 8, and the spring balance will recive only one-fifth of the tension exerted on the wire 24. If the arrangement shown in Fig. 3 is used and the member 8' is pulled the spring balance will receive only one-third of the tension exerted on the wire 24. The markings on the spring balance can be such as to indicate the actual tension on the wire, or the tension on the rope or in any other suitable manner.

In the form of the invention shown diagrammatically in Fig. 4, the tension indicating means comprising the pulley members 5 and 6 and spring balance 12 is the same as that shown in Fig. 1 except that a hook 23' is substituted for the member 22 and a block and tackle device 25 is interposed between the gripping device 15 and the wire 24". The block and tackle is provided with a plurality of lengths of rope between the pulleys thereof, four being shown in the present instance, the free end of said rope 26 being secured to the member 5 and the gripper 15 and block 27 being secured together in any suitable manner. In this form the hook 23' and the hook 28 are secured to any suitable anchorage and when a pull on rope 8" is exerted in the direction of the arrow, the pull exerted on the spring balance would be the same as that on said rope 8" and the pull on rope 26 would be five times that on rope 8" while the pull on the wire 24" will be five times as great as that on rope 26. This would cause the spring balance to receive one-twenty-fifth of the tension exerted on the wire 24". It will be evident from the above that any desired ratio between the tension of the wire and the tension on the measuring instrument can thus be obtained, and the measuring instrument can thus be made of any desired lightness and fineness.

It might be desirable, sometimes, to lock the pulleys at the end at which the pull on the rope 8 is ordinarily exerted. In Fig. 5 a block 9' is shown, provided with pulleys 18' and 20' and these are provided with a locking means 30. When the pulleys are locked by this means, in the arrangement shown in Figs. 1 and 2 for example, the tension would be distributed between four lengths of rope 7 and the tension indicator would receive one-fourth of the pull exerted on the wire 24.

While I have shown and described several specific forms of my invention in detail, I desire to have it understood that I do not intend to limit my invention to the details thereof, except as defined by the following claims:—

1. In a device for placing a flexible member under tension, a plurality of pulley members, a flexible member having lengths extending between said pulley members, said pulley members being provided with means for detachably securing the same to a flexible member that is to be placed under tension, and tension indicating means positioned in one of said lengths between said pulley members whereby said tension indicating means will be subjected to only a portion of the stress to be measured, said tension indicating means having a hook and one of said blocks having an eyelet adapted to receive said hook to connect said tension indicating means thereto.

2. In a device for stretching a wire, pairs of pulley blocks, connecting means mounted on each of said pulley blocks, said means providing a detachable connection at each end of said device and comprising an automatic wire gripping member for connecting said device with the wire, a flexible member having lengths extending between said pulley blocks for tensioning said wire, and a tension indicating means directly connected to one of said pulley blocks and to one end of said flexible member.

3. In a device for placing a flexible member under tension, a plurality of pulley members, a flexible member having lengths extending between said pulley members, a tension indicating means directly connected to one of said pulley members and to an end of said flexible member, and automatic gripping means directly connected to said pulleys for connecting said device to a member of which the tension is to be measured.

4. In a device of the character described, a plurality of pulleys, a flexible member having lengths extending between said pulleys, a tension indicating means interposed in one of the lengths of said flexible member, and means for locking one of said pulleys against rotation.

In witness whereof, I hereunto subscribe my name this 22nd day of April A. D., 1920.

CHARLES STANLEY RHOADS.